(12) United States Patent
Mairou et al.

(10) Patent No.: US 9,617,013 B2
(45) Date of Patent: Apr. 11, 2017

(54) ROTORCRAFT FUSELAGE STRUCTURE INCORPORATING A LOAD-BEARING MIDDLE FLOOR INTERPOSED BETWEEN A CABIN SPACE AND AN EQUIPMENT SPACE

(71) Applicant: AIRBUS HELICOPTERS, Marignane (FR)

(72) Inventors: Joseph Mairou, Vitrolles (FR); Jean Nicola, Aix en Provence (FR)

(73) Assignee: Airbus Helicopters, Marignane (FR)

( * ) Notice: Subject to any disclaimer, the term of this patent is extended or adjusted under 35 U.S.C. 154(b) by 197 days.

(21) Appl. No.: 14/529,572

(22) Filed: Oct. 31, 2014

(65) Prior Publication Data

US 2015/0122940 A1 May 7, 2015

(30) Foreign Application Priority Data

Nov. 5, 2013 (FR) ..................................... 13 02560

(51) Int. Cl.
*B64D 1/22* (2006.01)
*B64D 47/00* (2006.01)
(Continued)

(52) U.S. Cl.
CPC .............. *B64D 47/00* (2013.01); *B64C 1/062* (2013.01); *B64C 1/068* (2013.01); *B64C 1/18* (2013.01);
(Continued)

(58) Field of Classification Search
CPC ................ B64D 1/08; B64D 1/22; B64C 1/18
See application file for complete search history.

(56) References Cited

U.S. PATENT DOCUMENTS 3,036,797 A * 5/1962 Agusta ...................... B64C 1/22
244/137.1
3,966,147 A 6/1976 Wittko et al.
(Continued)

FOREIGN PATENT DOCUMENTS

DE 19924480 11/2000
DE 102006019220 10/2007
(Continued)

OTHER PUBLICATIONS

French Search Report for FR 1302560, Completed by the French Patent Office on Jul. 8, 2014, 8 Pages.
(Continued)

*Primary Examiner* — Philip J Bonzell
*Assistant Examiner* — Michael Kreiner
(74) *Attorney, Agent, or Firm* — Brooks Kushman P.C.

(57) ABSTRACT

A fuselage structure for a rotorcraft (1), the structure comprising load-bearing members including middle frames (9a, 9b) carrying a top floor (12a) and a middle floor (12b). The middle floor (12b) internally partitions the fuselage into two compartments (6, 7), including a cabin-forming top compartment (6) and a bottom compartment (7) having an open bottom (23) leading to the outside via the bottom face of the fuselage. The middle floor (12b) provides a loading plane in the top compartment (6) having a false-floor (27) made up of interchangeable slabs (28) fitted out in a variety of ways. The middle floor (12b) also forms an anchor member from which equipment (16, 17) for suspending can be suspended, which equipment is accessible from outside the fuselage through said open bottom (23).

20 Claims, 1 Drawing Sheet

(51) Int. Cl.
  *B64C 1/18* (2006.01)
  *B64D 11/06* (2006.01)
  *B64C 1/06* (2006.01)
  *B64C 27/04* (2006.01)

(52) U.S. Cl.
  CPC .............. *B64C 27/04* (2013.01); *B64D 1/22* (2013.01); *B64D 11/06* (2013.01)

(56) References Cited

U.S. PATENT DOCUMENTS

| | | |
|---|---|---|
| 4,860,972 A | 8/1989 | Lannerd et al. |
| 5,371,935 A | 12/1994 | Furs et al. |
| 5,451,015 A | 9/1995 | Cronkhite et al. |
| 5,517,895 A | 5/1996 | Sanderson |
| 5,562,264 A | 10/1996 | Bietenhader |
| 8,256,713 B2 | 9/2012 | Barre et al. |
| 8,403,261 B2 | 3/2013 | Delahaye et al. |
| 8,550,401 B2 | 10/2013 | Lieven et al. |
| 2003/0042363 A1 | 3/2003 | Dussac et al. |
| 2006/0243854 A1 | 11/2006 | Townsend et al. |
| 2009/0146010 A1 | 6/2009 | Cohen |
| 2011/0315821 A1 | 12/2011 | Siboni |
| 2012/0018569 A1 | 1/2012 | Toni et al. |
| 2012/0170227 A1* | 7/2012 | Bayliss .............. B64C 1/1446 361/727 |
| 2012/0193476 A1 | 8/2012 | Figoureux et al. |
| 2013/0033202 A1 | 2/2013 | Yoshizaki et al. |
| 2013/0213044 A1 | 8/2013 | Lollini et al. |
| 2014/0044914 A1 | 2/2014 | Kurtz et al. |

FOREIGN PATENT DOCUMENTS

| | | |
|---|---|---|
| EP | 0581626 | 2/1994 |
| EP | 2567896 | 3/2013 |
| FR | 1530625 | 6/1968 |
| FR | 2756255 | 5/1998 |
| FR | 2895369 | 6/2007 |
| FR | 2933065 | 1/2010 |
| FR | 2939404 | 6/2010 |
| FR | 2939405 | 6/2010 |
| FR | 2947524 | 1/2011 |
| FR | 2947527 | 1/2011 |
| FR | 2953485 | 6/2011 |
| FR | 2957050 | 9/2011 |
| FR | 2960514 | 12/2011 |
| FR | 2970944 | 8/2012 |
| FR | 2974754 | 11/2012 |
| FR | 2984273 | 6/2013 |
| JP | 2011179527 | 9/2011 |

OTHER PUBLICATIONS

Website http://sobchak.files.wordpress.com/2009/08/ch47cut.gif "Boeing Vertol CH-47D Chinook", Dated Dec. 1, 2012, Retrieved from the Wayback Machine on Oct. 16, 2014, All together 2 Pages.

English Translation of Japanese Office Action for Japanese Patent Application No. 2014-258911, Dated Nov. 11, 2015, 3 Pages.

* cited by examiner

US 9,617,013 B2

ROTORCRAFT FUSELAGE STRUCTURE INCORPORATING A LOAD-BEARING MIDDLE FLOOR INTERPOSED BETWEEN A CABIN SPACE AND AN EQUIPMENT SPACE

CROSS REFERENCE TO RELATED APPLICATION

This application claims priority to French patent application No. FR 13 02560 filed on Nov. 5, 2013, the disclosure of which is incorporated in its entirety by reference herein.

BACKGROUND OF THE INVENTION (1) Field of the Invention

The present invention relates to the field of aircraft fuselages made up mainly of stiffener members for stiffening a covering that defines the volume of the fuselage. The present invention relates more particularly to the structural arrangement of such a fuselage for a rotorcraft, and still more particularly to the mutual arrangement of fuselage members that are mechanically load-bearing relative to the general forces to which the fuselage is subjected.

In the field of aviation, aircraft fuselage structures comprise stiffener members constituted essentially firstly by longitudinal stiffeners for stiffening walls formed by a covering, and secondly by transverse stiffeners.

(2) Description of Related Art

For a so-called "multi-stringer shell" fuselage structure, the longitudinal stiffeners comprise longerons and bent or extruded section members, commonly referred to as stringers, that are fastened to the covering. Under such circumstances, the walls transmit all of the general forces supported by the fuselage to the fuselage structure, in particular in bending and in twisting.

The transverse stiffeners essentially comprise shaper frames, commonly referred to as strong frames, that are arranged in register with zones where forces are applied to the fuselage structure. Such frames, which may be individually of structures and shapes that are similar or distinct, are typically arranged in succession, being spaced apart from one another in the longitudinal direction of the fuselage between the front and the rear of the aircraft.

Furthermore, the frames are used for organizing the inside of the fuselage by providing supports for partitioning structures, such as vertical partitions or horizontal equipment floors. The inside volume of the fuselage is thus subdivided into a plurality of compartments providing cabin space functions or equipment space functions. Such partitioning structures serve essentially to support localized forces that are specific to their functions and they are commonly considered as being structures that are not load-bearing with respect to the general forces to which the fuselage is subjected.

In this context, the way in which the structure of the fuselage of an aircraft is arranged is closely associated with the type of aircraft, in particular with whether it is an airplane or a rotorcraft. Specifically, the fuselage structure needs to take account of the general forces to which the fuselage of an aircraft of a given type is typically subjected and also of the kinds of mission flown by that aircraft, which together determine the way in which the fuselage is arranged and the way in which the compartments subdividing its inside volume are organized.

For rotorcraft, the general forces to which the fuselage is subjected are generated essentially:

by one or more rotors or indeed by one or more propulsive propellers of the rotorcraft that provide it with lift, guidance, and propulsion in any travel direction. A rotorcraft typically has at least one main rotor of substantially vertical axis that provides the rotorcraft at least with lift and propulsion. The attitude in flight of the rotorcraft can be modified by the pilot acting on cyclic and/or collective variation of the pitch of the blades making up the rotary wing of the main rotor. Rotorcraft are also provided with an anti-torque device mounted at the end of a tail bottom and serving to guide the rotorcraft in yaw. Conventionally, but not exclusively, such an anti-torque device is constituted for example by a tail rotor having a substantially horizontal axis;

by one or more undercarriages forming interfaces between the rotorcraft and the ground, such as an undercarriage having wheels or skids. Such undercarriages generate general forces that are supported by the fuselage when the rotorcraft makes contact with the ground;

by transporting heavy loads, where "heavy" is conventionally considered as weighing more than 300 kilograms (kg) and may be as much as several (metric) tonnes. Such heavy loads, which are typically transported using slings, are conventionally distinguished from other loads that are considered as being light. As an indication, such "light" loads may for example relate to transporting freight by winching and/or in a hold, and may relate to various pieces of lightweight equipment on board the aircraft, or indeed to people being transported; and by carrying heavy equipment of the rotorcraft, such as fuel tanks and/or a power plant providing the mechanical power needed to operate the rotorcraft, and in particular to drive its rotor(s).

Under such conditions, the main rotor(s) and the power plant are mounted on the fuselage via a load-bearing top floor secured to at least two transverse frames defining a middle segment of the fuselage. Such a middle segment is interposed in particular between a cockpit and the tail boom carrying the anti-torque device. By way of example, reference may be made on this topic to Document US 2006/0243854 (Sikorsky Aircraft Corp.), which describes ways of mounting a rotorcraft main rotor on such a load-bearing top floor.

Undercarriages are conventionally connected to load-bearing members of the fuselage, in particular members engaging at least one transverse frame. By way of example, reference may be made to Document FR 2 895 369 (Eurocopter France), which describes ways of mounting skid landing gear to a rotorcraft fuselage.

For transporting heavy loads, sling equipment is commonly mounted on at least one load-bearing member of the fuselage, while ensuring that the axis on which heavy loads are carried by means of a sling is substantially in alignment with the axis of the main rotor in order to avoid destabilizing the rotorcraft. Sling equipment may potentially be installed under the fuselage or it may be carried by the top floor and then extend towards the ground, in particular after passing vertically through the inside volume of the fuselage. By way of example, reference may be made on this topic to Document FR 2 970 944 (Eurocopter France) which describes such sling equipment mounted on board a rotorcraft.

Fuel tanks may possibly be received in a bottom zone of the fuselage, commonly referred to as its bottom section, the fuel tanks resting on the bottom wall or belly constituting the bottom of the bottom section of the fuselage. The belly of the fuselage, which is subjected to the forces generated by the weight of the on-board fuel, is held in shape by means of the covering and by means of the longitudinal stiffeners of the fuselage that engage the bottom edges of the frames. By way of example, reference may be made on this topic to Documents FR 2 756 255 (Eurocopter France) and EP 2 567 896 (Eurocopter France), which describe ways of installing fuel tanks in compartments arranged in the substructure of a rotorcraft fuselage.

Fuel tanks may also be installed inside a compartment inside the fuselage and secured to the top floor and/or to at least one transverse frame of the fuselage. By way of example, reference may be made on this topic to Document U.S. Pat. No. 5,451,015 (Bell Helicopter Textron Inc.), which describes such ways of installing a fuel tank on board a rotorcraft behind a cockpit.

Auxiliary or main fuel tanks may also be installed laterally on the rotorcraft, being carried by at least one transverse frame of the fuselage and/or by at least one beam of the fuselage. By way of example, reference may be made on this topic to Documents U.S. Pat. No. 4,860,972 (ERA Aviat. Inc.) and U.S. Pat. No. 3,966,147 (Grumman Aerospace Corp.).

Furthermore, concerning the internal organization of the fuselage, a cabin space of the rotorcraft is conventionally organized as a front cockpit and at least one middle cabin space arranged between the cockpit and the tail boom. Vertical partitions subdivide the cabin space longitudinally and/or transversely, said partitions being supported directly or indirectly by the transverse frames of the fuselage. Such vertical partitions serve to provide various spaces inside the fuselage of the rotorcraft, such as at least one cabin space or at least one equipment space.

The fuselage is also conventionally subdivided by a horizontal equipment floor separating the cabin space from the bottom section. The cabin space is arranged above the bottom section, with at least one cabin space if not also the cockpit overlying one or more compartments in the bottom section providing a hold or housing fuel tanks.

The available space in the bottom section may also be potentially used for housing electrical cables, hydraulic or airflow ducts, or indeed linkages for transmitting flight commands, for example. Such electrical cables, hydraulic or airflow ducts, and/or linkages extending on board the aircraft are referred to below as "long members". The bottom section may also possibly be used for providing an equipment space housing equipment of the rotorcraft, and/or a hold.

By way of example, reference may be made on this topic of the internal arrangement of a rotorcraft fuselage to Document EP 0 581 626 (Eurocopter France).

With reference to the equipment floors that separate the cabin space from the bottom section, reference may be made to Document FR 2 974 754 (Daher Aerospace), which describes an embodiment of a composite panel used for forming an equipment floor for aircraft.

Reference may also be made to Documents FR 2 939 404 (Airbus France SA) and FR 2 939 405 (Airbus France SA), which describe ways of mounting such panels on board an aircraft in order to form an equipment floor. Equipment floors are commonly fastened to load-bearing members, such as beams, cross-members, and/or support legs, which members are mounted on the fuselage. By way of example, reference may be made to Documents FR 2 933 065 (Airbus France SAS), FR 2 957 050 (EADS France), FR 2 984 273 (Aerolia SAS), and FR 2 947 524 (Airbus Operations SAS), which describe various ways of mounting an equipment floor on board an aircraft.

When considering the structural arrangement of the fuselage, it is necessary to take account of the fact that the internal organization of the fuselage must be adaptable to the various flight missions that the rotorcraft might be required to undertake.

For example, it is necessary to take account of the wide variety of flight missions relating to transporting passengers in the cabin space, while allowing for different comfort thresholds depending on the quality and/or the function of the passengers on board. Also by way of example, specific flight missions relate to transporting light loads, such as transporting freight and/or to carrying specific pieces of equipment in the cabin space.

More particularly, such light loads that are transported may be located inside a compartment of the fuselage, such as in a hold or in a cabin space of the rotorcraft. Light loads may also be transported and/or moved between the outside and the inside of the fuselage by winching. Light loads are conventionally transported by winching performed by means of a winch carried by a fuselage member having the winch fastened thereto either directly or indirectly.

In the context of equipment floors forming loading planes that are fitted out beforehand depending on given flight missions, such planes are arranged in a variety of configurations depending on the specific flight missions of the rotorcraft. For example, equipment floors may be fitted out beforehand with a variety of fastener members for anchoring seats and/or freight, in particular, or indeed for anchoring various cords.

It can be understood that for a given flight mission of a rotorcraft, the equipment floor of the rotorcraft needs to be fitted out beforehand, e.g. for transporting a predefined number of passengers that might be variable, under comfort conditions and equipment conditions that vary depending on the quality and/or the on-board function of the passengers. The equipment floor may also be arranged specifically for transporting freight. By way of example, reference may be made on this topic to Documents U.S. Pat. No. 5,517,895 (Sanderson, P. H.), FR 2 953 485 (Airbus Operations SAS), and FR 2 947 527 (Airbus Operations).

Furthermore, equipment floors commonly include channels for passing electric cables for electrically powering equipment carried in the cabin either permanently or specifically for a given flight mission, or indeed for providing specific electrical power supply outlets that are suitable for use by passengers depending on their quality and/or their function on board the aircraft.

The variety of flight missions makes it difficult to use the same equipment floor for all potential flight missions of a rotorcraft. Therefore a variety of equipment floors that are specifically fitted out for respective flight missions are used as alternatives. By way of example, reference may be made on this topic to Document FR 2 960 514 (Airbus Operations).

Furthermore, having the equipment floor overlying the bottom section constituting the equipment space means that the equipment floor needs to be organized specifically to give an operator access to the volume inside the bottom section. For this purpose, hatches giving access to the bottom section are arranged and distributed in a variety of ways in such equipment floors. Nevertheless, accessing the bottom section is difficult, as mentioned in Documents U.S. Pat. No. 5,371,935 (United Tech. Corp.) and U.S. Pat. No. 3,966,147 (Grumman Aerospace Corp.), which propose overcoming such difficulties of accessing fuel tanks housed in specific compartments of the fuselage.

Consequently, it can be seen that the overall arrangement of a fuselage needs to take account of it being necessary for a variety of technical floors to be interchangeable quickly and easily. Specifically, it is appropriate for the way the fuselage is arranged to make it easy and quick to replace various equipment floors fitted out in specific ways, while also providing the facility of accessing the volume inside the bottom section that may house fuel tanks or any other equipment carried in the belly of the rotorcraft.

Furthermore, when designing the structure of the fuselage and the way it is organized externally, account must be taken of a situation in which the rotorcraft crashes. More particularly, the strength of the fuselage, and the way in which various pieces of equipment are installed on the fuselage needs to be taken into account in order to achieve good security for people in the event of the rotorcraft crashing.

In the context of an aircraft fuselage, the concepts of "load-bearing" and "non-load-bearing" are concepts commonly used by the person skilled in the art for describing members, where such concepts relate to whether fuselage members are or are not load-bearing relative to the general forces supported by the fuselage.

It should also naturally be understood that the concepts of "vertical", "horizontal", "longitudinal", "transverse", "front", "rear", "bottom", "top", and "overlying" are concepts that are relative and that need to be assessed relative to the situation of the rotorcraft when standing on the ground, and relative to the longitudinal extent of the fuselage between the front and the rear of the rotorcraft. Such concepts are commonly used by the person skilled in the art.

For knowledge of a technical background remote from the present invention but relating to fuselage structures for a rotorcraft, reference may also be made to Documents FR 1 530 625 (Boeing Co.), DE 10 2006 019220 (Hochschule für Angewandte), US 2009/146010 (Nehemia Cohen), DE 199 24 480 (Uti Holding & Man Ag), and also the document "Boeing Vertol Chinook HC Mk1", Pilot Press (Dec. 1, 2012) taken from the Internet on Jul. 7, 2014 at the following URL address: http://sobchak.files.wordpress.com/2009/08/ch47cut.gif In this context, it can be seen that structuring the fuselage of a rotorcraft involves continuous research on the part of the person skilled in the art confronted with a multitude of problems to be solved and difficulties to be overcome.

Solutions need to be found for achieving a satisfactory compromise between the various drawbacks and advantages associated with such solutions, often depending on the selections made by designers depending on their perceptions of the problems to be solved and the difficulties to be overcome.

BRIEF SUMMARY OF THE INVENTION

In this context of continuous research, the object of the present invention is to propose a rotorcraft fuselage structure that provides advantageous solutions procuring a compromise that is satisfactory relative to the above-mentioned problems and difficulties to be overcome.

The rotorcraft fuselage structure of the present invention extends longitudinally from the front to the rear of the rotorcraft, being made up of load-bearing stiffener members and of a load-bearing covering, the load-bearing stiffener members and the load-bearing covering taking up the general forces supported by the fuselage.

The load-bearing stiffener members comprise in particular load-bearing transverse frames locally defining the transverse profile of the fuselage and that are interconnected by the load-bearing covering as stiffened by load-bearing longitudinal stiffeners. The fuselage includes in particular a middle segment that is longitudinally interposed between a cockpit and a tail boom carrying an anti-torque device. A load-bearing top floor is securely engaged with at least two of said frames, referred to as middle frames. Such middle frames are incorporated in the middle segment of the fuselage. The top floor provides a top wall for the fuselage and constitutes a member for installing on the fuselage at least one substantially vertical axis main rotor of the rotorcraft, and possibly also a power plant delivering the mechanical power needed for driving at least one rotor of the rotorcraft.

The fuselage has partitioning structures subdividing the inside volume of the fuselage into various compartments. These compartments include at least one top compartment having a cabin space function and at least one bottom compartment having an equipment space function, which compartments are separated from each other by such a partitioning structure formed by a middle floor arranged in a vertically middle zone of the fuselage and having the top floor overlying it at least in part. The middle floor presents a loading plane at its top face serving in particular to allow people to move around and to enable freight and/or equipment of the rotorcraft to be installed in the top compartment.

According to the present invention, said middle floor is securely engaged with at least one of said middle frames so as the middle floor constitutes a load-bearing floor. The bottom compartment is free from said covering on the bottom face of the fuselage, which bottom face is open to the outside providing an open bottom for the bottom compartment leading to the outside of the fuselage.

It can be seen that contrary to convention in the field of rotorcraft, it has been chosen to subdivide the inside volume of the fuselage, at least in its middle segment, by means of a load-bearing floor that is placed in a vertically middle zone of the fuselage. The inside volume of the fuselage is vertically subdivided into two compartments, each having a horizontal wall that is load-bearing relative to the general forces to which the fuselage is subjected overall. Advantage may be taken of such a load-bearing horizontal wall to overcome the difficulties specific to the ways in which the bottom compartment and the top compartment are arranged independently of each other.

For example, the middle floor is suitable for constituting a plane for fastening modular elements that may be arranged as slabs that have previously been fitted out for receiving specific pieces of equipment depending on the flight mission of the rotorcraft. Such slabs may constitute a false-floor that is easily interchangeable by selectively replacing slabs. In addition, such a false-floor can easily be raised relative to the top face of the middle floor in order to provide passages for said long elements.

Also by way of example, the middle floor is suitable for enabling the bottom compartment to present a vertical extent that may be significant, depending on the flight missions of the rotorcraft, by benefiting from the ease with which the bottom compartment can be accessed from outside the rotorcraft through the open bottom of the rotorcraft formed in the bottom face of the fuselage that does not have the covering, at least in its middle segment.

Access to the bottom compartment from the bottom face of the fuselage through said open bottom of the bottom compartment may be used to advantage for facilitating the installation and maintenance of fuel tanks received in the bottom compartment and anchored by being suspended from the bottom face of the middle floor.

In addition, the open bottom of the bottom compartment makes it easier to install and use heavy equipment, should that be necessary, such as sling equipment installed on board the rotorcraft, in particular by anchoring said heavy equipment by suspending it from the bottom face of the middle floor.

In addition, loading and storing freight inside the bottom compartment by winching can advantageously be made easier by using a winch that is itself anchored by being suspended from the bottom face of the middle floor. A nacelle that is movable using said winch housed in the bottom compartment may be used for embarking freight into the bottom compartment. Advantage may advantageously be taken of the nacelle for closing the open bottom of the bottom compartment while the rotorcraft is in flight.

Furthermore, in the event of the rotorcraft crashing, the middle floor forms a shield suitable for increasing protection of people and goods transported in the top compartment, and possibly also for increasing protection in the cockpit. The middle floor forms a robust obstacle that strongly resists any intrusion of external elements into the top compartment, such as for example equipment housed in the bottom compartment and/or an undercarriage.

Such an undercarriage may be fitted to the rotorcraft by making use of a structure that is engaged with the middle floor, directly or indirectly via load-bearing members of the fuselage.

The middle floor provides via its bottom face a suspension anchor member for at least one equipment to be suspended by being accessible from outside the fuselage through said open bottom. In particular, the middle floor is provided on its bottom face constituting the load-bearing ceiling of the bottom compartment with means for supporting said equipment in suspension, which equipment may be selected from at least any one of the following pieces of equipment to be suspended:

at least one fuel tank;
slinging equipment dedicated to transporting heavy loads; and
winching equipment dedicated to engaging light loads on board in the bottom compartment.

Such means for suspending equipment for suspending may potentially be incorporated permanently in the middle floor, being used selectively depending on requirements and in particular depending on which pieces of equipment for suspending are installed by being suspended inside the bottom compartment.

In an embodiment, the bottom compartment is defined between the middle floor and a lateral skirt arranged in the substructure of the fuselage to extend the covering. Said skirt advantageously defines said open bottom at the margins of free edges of the skirt arranged at its bottom face that is open to the outside of the fuselage.

The skirt is preferably provided with members for reinforcing the way it is held in shape, and in particular against flexing transversely.

Said reinforcing members may extend equally well in the longitudinal direction and/or in the transverse direction of the skirt. By way of example, said reinforcing members may be arranged as box beams, preferably located that the base of the skirt at the margin of said open bottom.

Furthermore, the top face of the middle floor serves in particular to form a plane for fastening a false-floor. Such a false-floor is advantageously made up of interchangeable slabs selected from a set of slabs respectively pre-fitted with fastener members that are specific to particular pieces of equipment of the rotorcraft. The top compartment is suitable for being arranged to match a variety of flight missions of the rotorcraft by selective replacement of the slabs.

By way of example, said fastener members are conventionally constituted by rails or slideways for installing seats, attachment members for holding freight, fastener members for cords from which people can be suspended (helicopter "winching"), members for installing computer equipment consoles, or indeed power outlets for connection to an on-board electrical power supply, in particular as delivered by the on-board electricity network of the rotorcraft.

The top compartment is suitable for being arranged to accommodate specific pieces of equipment depending on a variety of flight missions to be undertaken by the rotorcraft by easy selective replacement of slabs depending on where they are located on the fastener plane, and by selecting slabs from a set of slabs specifically fitted out for receiving one or more pieces of equipment useful in performing one or more given flight missions.

More particularly, said slabs are individually fitted out in advance with fastener members for pieces of equipment of the rotorcraft, said pieces of equipment including at least any one of the following pieces of equipment:

at least one seat;
at least one freight attachment member;
at least one cord for supporting personnel in suspension;
at least one console including at least one computer instrument and at least one information display screen;
at least one outlet for connection to the electrical power supply network on board the rotorcraft; and
at least one outlet for connection to an information communications network of the rotorcraft.

In an advantageous embodiment, a passage is provided for long elements between the top face of the middle floor and the false-floor. Such a passage avoids the need for the top compartment to lose part of its "footprint" area to the ducts traditionally provided for protecting such long elements running over the surface of the loading plane and impeding movement of people in the top compartment and/or impeding the loading of freight inside the top compartment.

As mentioned above, such long elements, in isolation or in combination, may potentially comprise:

electrical power supply cables and/or information transmission cables;
air flow ducts, such as ducts in communication with an installation for ventilating, heating, and/or air conditioning that serves to ventilate the top compartment locally, depending on how it is arranged;
liquid flow ducts, such as for example ducts for conveying fuel from at least one fuel tank housed in the bottom compartment to a power plant installed on the top floor;
at least one linkage for transmitting flight commands; and
hydraulic ducts for transmitting fluid under pressure for powering the operation of a member of the rotorcraft, such as for example the blades of the rotary wing of any rotor of the rotorcraft.

Said open bottom is preferably provided with a removable shutter wall providing alternatively, firstly by removal an access to the bottom compartment from outside of the rotorcraft on ground, and secondly providing in flight, by its installation on the fuselage, a closing element of bottom compartment. The removable shutter wall making it possible, on being removed, to have access to the bottom compartment when the rotorcraft is on the ground, and serving, when installed on the fuselage, to close the bottom compartment or when the rotorcraft is in flight.

Said removal shutter wall may advantageously be formed by a nacelle forming part of winching equipment carried in suspension from the bottom face of the middle floor.

By way of example, the middle floor is made up of load-bearing panels carried by load-bearing cross-members secured with at least the middle frames via load-bearing longerons interconnecting the cross-members.

In an embodiment, said panels are laminated panels arranged as honeycomb panels reinforced by at least one reinforcing ply of composite material incorporating multi-directional fibers embedded in a resin matrix. In a variant, the laminated panels are arranged as honeycomb panels reinforced by metal plates, such as aluminum plates, for example.

The panels may be fastened by riveting to said cross-members and/or to said longerons, and their edges are preferably received in channels formed in at least said cross-members, and possibly also in said longerons, in order to reinforce the overall strength of the middle floor relative to general forces supported by the fuselage.

Advantageously, the middle floor constitutes a shield providing protection against intrusion into the top compartment of elements external to said top compartment. Such external elements may for example be elements external to the rotorcraft or elements that are normally housed in the bottom compartment, or indeed an undercarriage.

The present invention also provides a rotorcraft including a fuselage structure as described above.

BRIEF DESCRIPTION OF THE SEVERAL VIEWS OF THE DRAWINGS

An embodiment of the present invention is described with reference to the figures of the accompanying sheet, in which.

DETAILED DESCRIPTION OF THE INVENTION

Figure 1:
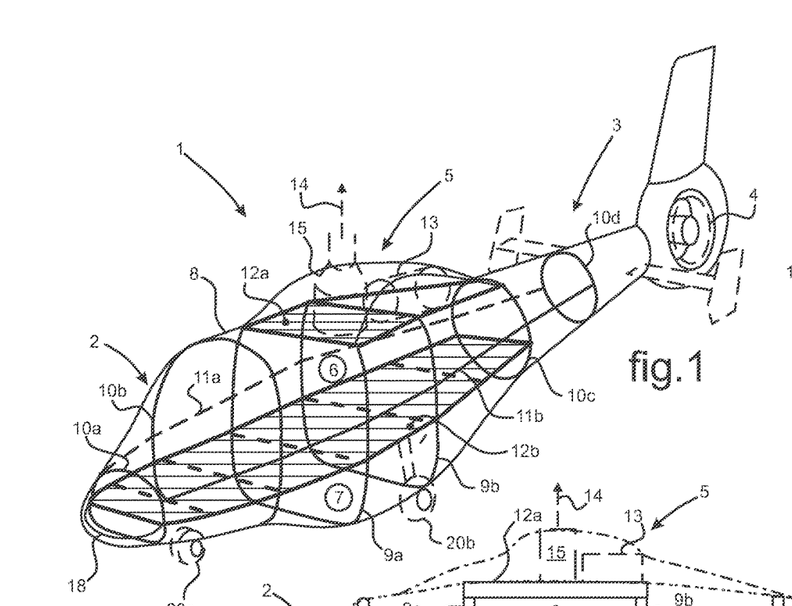
FIGS. 1 and 2 are schematic illustrations of a rotorcraft having a fuselage structure in an embodiment of the present invention, the figures showing it respectively in perspective and in a longitudinal view.
Figure 2:
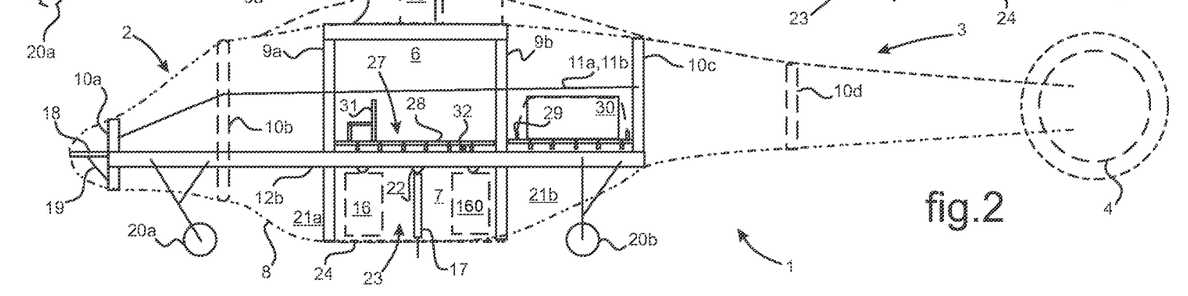

In FIGS. 1 and 2, a rotorcraft 1 comprises longitudinally a cockpit 2 situated at the front and a tail boom 3 supporting and anti-torque device 4, such as a tail rotor, for example. The cockpit 2 and the tail boom 3 are spaced apart from each other longitudinally by a middle segment 5 of the fuselage of the rotorcraft 1.

The middle segment 5 is partitioned by a middle floor dividing a top compartment 6 forming a cabin space from bottom compartment 7 forming an equipment space.

The fuselage of the rotorcraft 1 extends longitudinally from front to rear of the rotorcraft and includes members for stiffening a covering 8. The stiffening members conventionally comprise longitudinal stiffeners such as 11a and 11b and transverse frames 9a, 9b and 10a, 10b, 10c, and 10d arranged so as to be spaced apart longitudinally from one another while locally defining the transverse profile of the fuselage of the rotorcraft 1. The covering 8, the frames 9a, 9b and 10a, 10b, 10c, and 10d, and the longitudinal stiffeners 11a, 11b are load-bearing members of the structure of the fuselage.

The fuselage also has a load-bearing top floor 12a secured to at least two middle frames 9a, 9b of said middle segment 5. The top floor 12a forms a top wall of the fuselage and constitutes a fuselage member for supporting a power plant 13 and a substantially vertical axis main rotor 14 of the rotorcraft 1 via a main gearbox (MGB) 15.

The middle floor is constituted by a load-bearing middle floor 12b incorporated in the fuselage structure and having the top floor 12a overlying at least part of it. The middle floor 12b is secured to at least two frames of the middle segment 5, and more particularly to said two middle frames 9a, 9b to which the top floor 12a is secured.

It can be seen that the fuselage thus comprises a load-bearing assembly made up of various fuselage members that are load-bearing relative to the general forces supported by the fuselage, and comprising:

load-bearing stiffener members of the fuselage comprising the frames 9a, 9b; 10a, 10b, 10c, 10d and the longitudinal stiffeners 11a, 11b for stiffening the covering 8;

the covering 8 that is load-bearing, at least locally, in particular for transmitting said general forces to the frames 9a, 9b and 10a, 10b, 10c, 10d;

the top floor 12a supporting in particular at least the main rotor 14 if not also a power plant 13 delivering the mechanical power needed by the rotorcraft 1; and the middle floor 12b secured to the frames 9a, 9b; 10a, 10b, 10c, 10d, in particular for transmitting said general forces supported by the fuselage as generated in particular by loads carried in suspension by the middle floor 12b.

The middle floor 12b extends at least along the middle segment 5, and possibly also, as shown, towards the front of the rotorcraft 1 into the cockpit 2 and/or towards the rear of the rotorcraft 1 towards the tail boom 3. The middle floor 12b forms a structure that partitions the middle of the fuselage vertically in order to separate the top compartment 6 from the bottom compartment 7, mainly in the zone of the middle segment 5, and where necessary possibly also at least in part in the cockpit 2.

In the cockpit 2, a nose equipment floor 18 may be arranged to extent the middle floor 12b. Such a nose equipment floor 18 is not load-bearing relative to the general forces supported by the fuselage as is usual in the field of rotorcraft. The nose equipment floor 18 may easily be carried by the middle floor 12b and/or by means of at least one frame, such as the frame 10a, in particular by means of non-load-bearing intermediate members such as, by way of example, intermediate members arranged as props 19, as shown in FIG. 2.

The middle floor 12b may also be used for anchoring at least one undercarriage via its bottom face, such as a front undercarriage 20a and/or a rear undercarriage 20b as shown by way of example in FIGS. 1 and 2. Such undercarriages 20a, 20b may potentially be movable between an extended position and a retracted position, and while the rotorcraft 1 is in flight they may advantageously be housed in chambers 21a, 21b of the bottom compartment 7, as shown in FIG. 2. In the event of the rotorcraft 1 crashing, the middle floor 12b provides increased protection for the cockpit 2 and/or the top compartment 6 against intrusion of the landing gear 20a, 20b.

Figure 3:
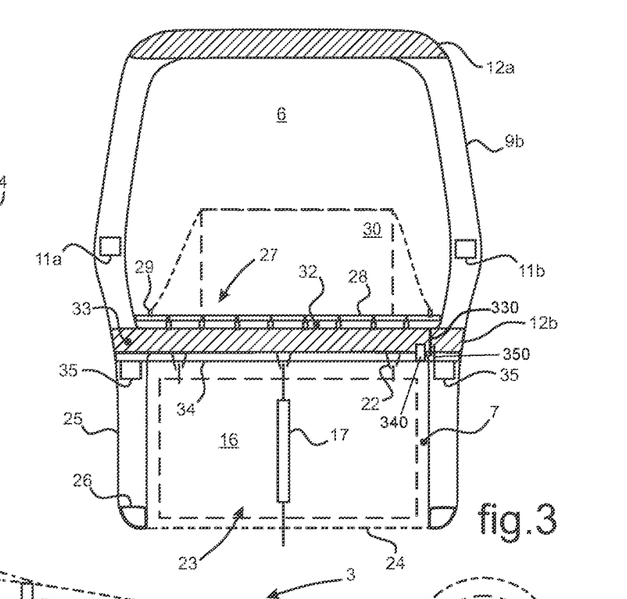
FIG. 3 is a schematic cross-section view through the middle of a rotorcraft fuselage, such as for example the rotorcraft fuselage shown in FIGS. 1 and 2.

In FIGS. 1 to 3, the bottom compartment 7 may potentially be of considerable volume and it may be open in the bottom face of the fuselage that is not provided with the covering 8 so as to leave the bottom compartment 7 with an open bottom that is open to the outside of the fuselage. Possibly heavy equipment may be suspended from the middle floor 12b, while being easily accessible to an operator from outside the rotorcraft 1 since its belly does not have the covering 8.

In FIGS. 2 and 3, the equipment for suspending may be constituted for example by at least one fuel tank 16 and sling equipment 17 dedicated to transporting heavy loads, or indeed winching equipment (not shown) dedicated to transporting light loads on board, in the bottom compartment 7.

The bottom face of the middle floor 12b is fitted with means 22 for supporting in suspension at least one item of said equipment that is to be suspended. Such suspension support means 22 may be arranged for example as at least one attachment member for co-operating with an attachment member provided on the equipment that is to be suspended, such as for example straps fitted to the fuel tank(s) 16 and/or a hook for the sling equipment 17 or for the winch equipment.

Said open bottom 23 gives easy access to the bottom compartment 7. This ease of access to the bottom compartment 7 serves to facilitate installing and maintaining the equipment for suspension, or it serves to allow a sling of the sling equipment 17 to be passed outside the rotorcraft.

The open bottom 23 may optionally be shut by a removable shutter wall 24 closing the bottom compartment 7 when that is useful, in particular while the rotorcraft is in flight. By way of example, such a shutter wall 24 may be arranged as a cap that is fastened to the fuselage at the margins of the open bottom 23 by easily reversible junction means, such as screws or clips. The shutter wall 24 may easily be removed for transporting heavy loads by means of the sling equipment 17 or for installing and/or maintaining the equipment that is to be suspended, such as said fuel tanks 16. In an embodiment, a nacelle 160 forming part of winching equipment is suspended from the middle floor 12b could be used as said shutter wall 24.

In the event of the rotorcraft crashing, the middle floor 12b advantageously provides a shield for protecting people and goods located at least inside the top compartment 6, and possibly also in the cockpit 2, against the suspended equipment 16, 17 housed in the bottom compartment 7.

Furthermore, and still as shown in FIGS. 2 and 3, the middle floor 12b provides a loading plane inside the top compartment 6. Such a loading plane is conventionally used for transporting passengers and/or for transporting freight 30 inside the top compartment 6.

Since the open bottom 23 gives access to the bottom compartment 7 from outside the fuselage, the top face of the middle floor 12b is not subjected to any constraint concerning giving access to the bottom compartment 7 and can therefore be organized freely depending on the flight missions of the rotorcraft. For this purpose, the top face of the middle floor 12b is suitable for constituting a plane for fastening a false-floor 27 made up of modular slabs 28 that are individually fitted out and that may be interchanged depending on requirements.

Such fitted-out slabs 28 may be provided selectively with fastener members, such as members 29 for fastening freight attachment equipment 30 as shown. Naturally, the slabs 28 are fitted out with fastener members 29 that are specific to the equipment that is to be installed inside the top compartment 6.

Such fastener members are known in the field of rotorcraft, e.g. being constituted by members for fastening seats, such as the seat 31 shown in FIG. 2, or members for fastening instruments or pieces of equipment, or indeed members for fastening electrical connections for such instruments or pieces of equipment either for interconnecting them or for powering them electrically from the on-board power supply network or suitable for use by the personal equipment of a passenger.

The modular nature of the false-floor 27 is used to facilitate adapting the rotorcraft to the various flight missions it is to undertake, such as transporting freight, specific equipment, and/or passengers. For passengers, the modularity of the false-floor 27 may be used to adapt the comfort and reception conditions provided by the rotorcraft depending on the number, the quality, and/or the on-board tasks of the passengers.

Making use of a false-floor 27 fastened to the top face of the middle floor 12b makes it easy to provide at least one passage 32 for elements extending between the various segments of the fuselage. Such a passage 32 can easily be provided by raising the false-floor. The presence of such passages makes it easier to fit out the top compartment 6, and possibly also the cockpit 2, depending on requirements.

In FIG. 3, the bottom compartment 7 is defined between the middle floor 12b and a lateral skirt 25 of the fuselage that extends the fuselage wall defining the top compartment 6 and possibly also the cockpit 2. At its bottom face, the free edges of the skirt 25 define the open bottom 23 of the bottom compartment 7. The skirt 25 is preferably provided with reinforcement members 26 helping to keep it in shape, in particular against transverse flexing. By way of example, such reinforcement members 26 may be arranged as longitudinal box beams located at the base of the skirt 25. By way of example, the middle floor 12b is made up of panels 33 carried by stiffener members 34, 35 of the fuselage. Such stiffener members may comprise in particular load-bearing cross-members 34 secured with at least the middle frames 9a, 9b by means of load-bearing longerons 35 interconnecting the cross-members 34. In FIG. 3, panels 33 have edges 330 received by channels 340, 350 formed at least in part by said cross-members 34 and/or in said longerons 35.

What is claimed is:

1. A fuselage structure for a rotorcraft extending longitudinally from the front to the rear of the rotorcraft and made up of load-bearing stiffener members and a load-bearing covering, the stiffener members comprising load-bearing transverse frames locally defining a transverse profile of the fuselage structure, and load-bearing longitudinal stiffeners, the fuselage structure having a middle segment longitudinally interposed between a cockpit and a tail boom carrying an anti-torque device, a load-bearing top floor being securely engaged with at least two of the frames, referred to as middle frames and incorporated in the middle segment of the fuselage structure, the top floor providing a top wall of the fuselage and constituting a member for installing at least a substantially vertical axis main rotor of the rotorcraft on the fuselage structure, the fuselage structure being fitted with partitioning structures defining a plurality of compartments in the inside volume of the fuselage, including at least one top compartment having a cabin space function, and at least one bottom compartment having an equipment space function, the top compartment and the bottom compartment being separated from each other by a middle floor arranged vertically between the top compartment and the bottom compartment, the fuselage structure having the top floor overlying the middle floor at least in part, the middle floor providing via its top face a loading plane in the top compartment, wherein the middle floor is secured with at least the middle frames by forming a load-bearing floor, the bottom compartment being free of the covering on a bottom face of the fuselage structure, the middle floor being made up of reinforced panels carried by stiffener members forming load-bearing cross-members and load-bearing longerons of the fuselage structure, the reinforced panels being secured to the load-bearing cross-members and load-being longerons, the fuselage structure having a bottom face that is open to the outside by providing an open bottom for the bottom compartment leading to the outside of the fuselage structure.

2. A rotorcraft fuselage structure according to claim 1, wherein the middle floor provides via its bottom face a suspension anchor member for at least one equipment to be suspended by being accessible from outside the fuselage structure through the open bottom.

3. A rotorcraft fuselage structure according to claim 2, wherein the middle floor is provided via its bottom face forming the ceiling of the bottom compartment with suspension support means for supporting the equipment that is to be suspended, which equipment is selected from at least one any one of the following:
   at least one fuel tank;
   slinging equipment dedicated to transporting heavy loads; and
   winching equipment dedicated to engaging light loads on board in the bottom compartment.

4. A rotorcraft fuselage structure according to claim 1, wherein the bottom compartment is defined between the middle floor and a lateral skirt arranged in a substructure of the fuselage structure to extend the covering, the skirt defining the open bottom at the margins of free edges of the skirt arranged at its bottom face that is open to the outside of the fuselage structure.

5. A rotorcraft fuselage structure according to claim 1, wherein the top face of the middle floor forms a plane for fastening a false-floor made up of interchangeable slabs selected from a set of slabs respectively pre-fitted with fastener members that are specific to particular pieces of equipment of the rotorcraft, the top compartment being suitable for being arranged to match a variety of flight missions of the rotorcraft by selective replacement of the slabs.

6. A rotorcraft fuselage structure according to claim 5, wherein the slabs are individually pre-fitted with the fastener members for fastening pieces of equipment of the rotorcraft selected from at least any one of the following pieces of equipment:
   at least one seat;
   at least one freight attachment member;
   at least one cord for supporting personnel in suspension;
   at least one console including at least one computer instrument and at least one information display screen;
   at least one outlet for connection to an electrical power supply network on board the rotorcraft; and
   at least one outlet for connection to an information communications network of the rotorcraft.

7. A rotorcraft fuselage structure according to claim 5, wherein a passage is provided for long elements between the top face of the middle floor and the false-floor.

8. A rotorcraft fuselage structure according to claim 1, wherein the open bottom is provided with a removable shutter wall, the removable shutter wall providing, by removal, an access to the bottom compartment from outside of the rotorcraft on ground and providing in flight, by its installation on the fuselage structure, a closing element of bottom compartment.

9. A rotorcraft fuselage structure according to claim 8, wherein the removable shutter wall is formed by a nacelle forming part of winching equipment carried in suspension from the bottom face of the middle floor.

10. A rotorcraft fuselage structure according to claim 1, wherein the load-bearing cross-members are secured with at least the middle frames via the load-bearing longerons interconnecting the cross-members.

11. A rotorcraft fuselage structure according to claim 10, wherein the panels are laminated panels arranged as reinforced honeycomb panels.

12. A rotorcraft fuselage structure according to claim 10, wherein the panels have their edges received in channels formed at least by the cross-members if not also by the longerons.

13. A rotorcraft fuselage structure according to claim 1, wherein the middle floor constitutes a shield providing protection against intrusion into the top compartment of elements external to the top compartment.

14. A rotorcraft including a fuselage structure according to claim 1.

15. A fuselage structure for a rotorcraft comprising:
   first and second load-bearing transverse end frames, each transverse end frame locally defining a transverse profile of the fuselage structure, the first transverse frame positioned at a first longitudinal end of the structure, and the second transverse frame positioned at a second opposed longitudinal end of the structure;
   first and second load-bearing transverse middle frames longitudinally spaced apart from one another and positioned between the first and second transverse end frames in a middle segment of the structure longitudinally positioned between a cockpit and a tail boom carrying an anti-torque device, each transverse middle frame locally defining the transverse profile of the fuselage structure;
   first and second load-bearing longitudinal stiffeners securing the first and second transverse end frames and the first and second transverse middle frames to one another;
   a load-bearing top floor extending between and secured to the first and second transverse middle frames, the top floor providing a top wall of the fuselage structure, the top floor having a substantially vertical axis main rotor of the rotorcraft installed thereon;
   first and second load-being longerons secured to and interconnecting the first and second transverse middle frames, the first and second longerons extending longitudinally;
   a plurality of load-bearing cross-members extending transversely between and secured to the first and second longerons;
   a load-bearing middle floor formed by reinforced panels secured to and supported by the load-bearing cross-members and the load-bearing longerons, the middle floor partitioning and separating the middle segment of the fuselage structure into a top cabin space compartment and a bottom equipment space compartment, a top face of the middle floor providing a loading plane for the top compartment, the top floor overlying the middle floor to define the top compartment extending therebetween; and
   a load-bearing covering forming walls for the fuselage and connected to the first and second transverse end frames, the first and second transverse middle frames, and the plurality of longitudinal stiffeners;
   wherein a bottom face of the fuselage structure is free of the covering such that the bottom compartment is open to the outside of the fuselage structure via an open bottom of the bottom compartment.

16. The fuselage structure of claim 15 wherein the first and second longitudinal stiffeners each extend from the first transverse end frame to the second transverse end frame, the first and second longitudinal stiffeners defining a longitudinal profile of the fuselage structure.

17. The fuselage structure of claim 15 wherein the covering forms a skirt, the skirt cooperating with the middle floor to define the bottom compartment, a free edge of the skirt defining the open bottom of the bottom compartment.

18. The fuselage structure of claim 17 further comprising reinforcement members connected to the skirt and positioned adjacent to the free edge of the skirt and about the open bottom of the bottom compartment.

19. The fuselage structure of claim 15 further comprising a suspension anchor member connected to a bottom face of the middle floor, the suspension anchor member supporting at least one of a fuel tank, slinging equipment, and winching equipment to be accessible via the open bottom.

20. The fuselage structure of claim 15 wherein the middle floor extends from the first transverse end frame to the second transverse end frame to at least partially define the cockpit and the top compartment; and
    wherein the fuselage structure further comprises a first and second undercarriage for the rotorcraft, the first and second undercarriage anchored to the bottom face of the middle floor.

\* \* \* \* \*